(12) United States Patent
Astigarraga et al.

(10) Patent No.: US 8,990,504 B2
(45) Date of Patent: Mar. 24, 2015

(54) STORAGE CONTROLLER CACHE PAGE MANAGEMENT

(75) Inventors: Tara Astigarraga, Tucson, AZ (US); Michael E. Browne, Staatsburg, NY (US); Joseph Demczar, Salt Point, NY (US); Eric C. Wieder, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 13/180,380

(22) Filed: Jul. 11, 2011

(65) Prior Publication Data

US 2013/0019063 A1  Jan. 17, 2013

(51) Int. Cl.
*G06F 12/00* (2006.01)
*G06F 12/12* (2006.01)

(52) U.S. Cl.
CPC .................................. *G06F 12/126* (2013.01)
USPC ........... 711/125; 711/118; 711/126; 711/128;
711/133; 711/134; 711/135; 711/136; 711/154;
711/159; 711/160; 711/206; 711/209; 711/221;
711/E12.005; 711/E12.022; 711/E12.04;
711/E12.054

(58) Field of Classification Search
CPC . G06F 12/08; G06F 12/0882; G06F 12/1009;
G06F 12/1018; G06F 12/12; G06F 12/121;
G06F 12/122; G06F 12/123
USPC ......... 711/118, 126, 133–136, 154, 159–160,
711/206, 209, 221, E12.005, E12.022,
711/E12.04, E12.054, 4, 100, 104–105,
711/111–113
See application file for complete search history.

(56) References Cited

U.S. PATENT DOCUMENTS

| 5,675,763 | A | 10/1997 | Mogul |
| 2004/0205297 | A1 | 10/2004 | Bearden |
| 2007/0268754 | A1 | 11/2007 | Lee et al. |
| 2008/0109607 | A1* | 5/2008 | Astigarraga et al. .......... 711/135 |
| 2008/0215848 | A1* | 9/2008 | Sheu et al. .................... 711/207 |
| 2008/0250195 | A1* | 10/2008 | Chow et al. ................... 711/103 |
| 2009/0164715 | A1* | 6/2009 | Astigarraga et al. .......... 711/112 |
| 2011/0145546 | A1* | 6/2011 | Woffinden ...................... 712/30 |

* cited by examiner

*Primary Examiner* — Jared Rutz
*Assistant Examiner* — Zhou H Li
(74) *Attorney, Agent, or Firm* — Cantor Colburn LLP; Steven Chiu

(57) ABSTRACT

A cache page management method can include paging out a memory page to an input/output controller, paging the memory page from the input/output controller into a real memory, modifying the memory page in the real memory to an updated memory page and purging the memory page paged to the input/output controller.

15 Claims, 4 Drawing Sheets

STORAGE CONTROLLER CACHE PAGE MANAGEMENT

BACKGROUND

The present invention relates to memory cache, and more specifically, to systems and methods for optimizing storage controller cache by deleting stale pages from read caches.

In computing systems, memory pages can be paged into and out of real memory due to constraints in the computing system. For example, a memory page can be paged to a secondary memory device (e.g., a hard drive) and stored in the storage controller cache associated with the secondary memory device. Typically, after a memory page is paged out to secondary storage and then paged back into real memory due to a virtual memory demand request, the memory paged in real memory can be modified. When the memory page is paged back into the real memory and then modified, a copy of the unmodified page remains in the storage controller cache, and is thus a stale version that takes up limited storage space in the storage controller cache. In addition, other valid data may migrate from the storage cache controller if additional storage space is needed in the storage controller cache. For example, current least recently used (LRU) algorithms will delete a memory page from the storage controller cache if the memory page is used the least and additional storage controller cache space is needed. As such a valid memory page may be removed from the storage controller cache if it is not used as according to the LRU algorithm. As such, current algorithms do not include the ability to purge stale invalid pages from storage controller cache.

SUMMARY

Exemplary embodiments include a cache page management method, including paging out a memory page to an input/output controller, paging the memory page from the input/output controller into a real memory, modifying the memory page in the real memory to an updated memory page and purging the memory page paged to the input/output controller.

Additional exemplary embodiments include a computer program product including a non-transitory computer readable medium readable by a processing circuit and storing instructions for execution by the processing circuit for causing a computer to implement a cache page management method. The method can include paging out a memory page to an input/output controller, paging the memory page from the input/output controller into a real memory, modifying the memory page in the real memory to an updated memory page and purging the memory page paged to the input/output controller.

Further exemplary embodiments include a cache page management system, including a processor, an input/output controller operatively coupled to the processor, a storage controller cache residing on the input/output controller, a real memory operatively coupled to the processor and the input/output controller, a storage device operatively coupled to the input/output controller and a cache page management process residing in the real memory. The cache management process can include instructions for paging out a memory page to the storage controller cache, paging the memory page from the storage controller cache into the real memory, modifying the memory page in the real memory to an updated memory page and purging the memory page paged to storage controller cache.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein increase cache efficiency by actively deleting stale pages. The systems and methods described herein can generate comments to send to storage controllers or optionally to the command queuing mechanism within the operating system as needed to purge the stale version of the page being stored in the storage controller cache. As such additional cache optimization is realized by removing outdated pages leaving additional cache room for current and relevant pages to be stored, which can also prevent deletion of valid data. In addition fewer pages reside in cache, thereby reducing the processing time for the various garbage collection algorithms within the storage controller microcode. Further, by pro-actively purging these pages, the systems and methods described herein reduce the chance for bugs that can occur by reading in stale data from the storage controller cache. In addition, pages within the storage controller cache can be flushed to optimize performance.

Figure 1:
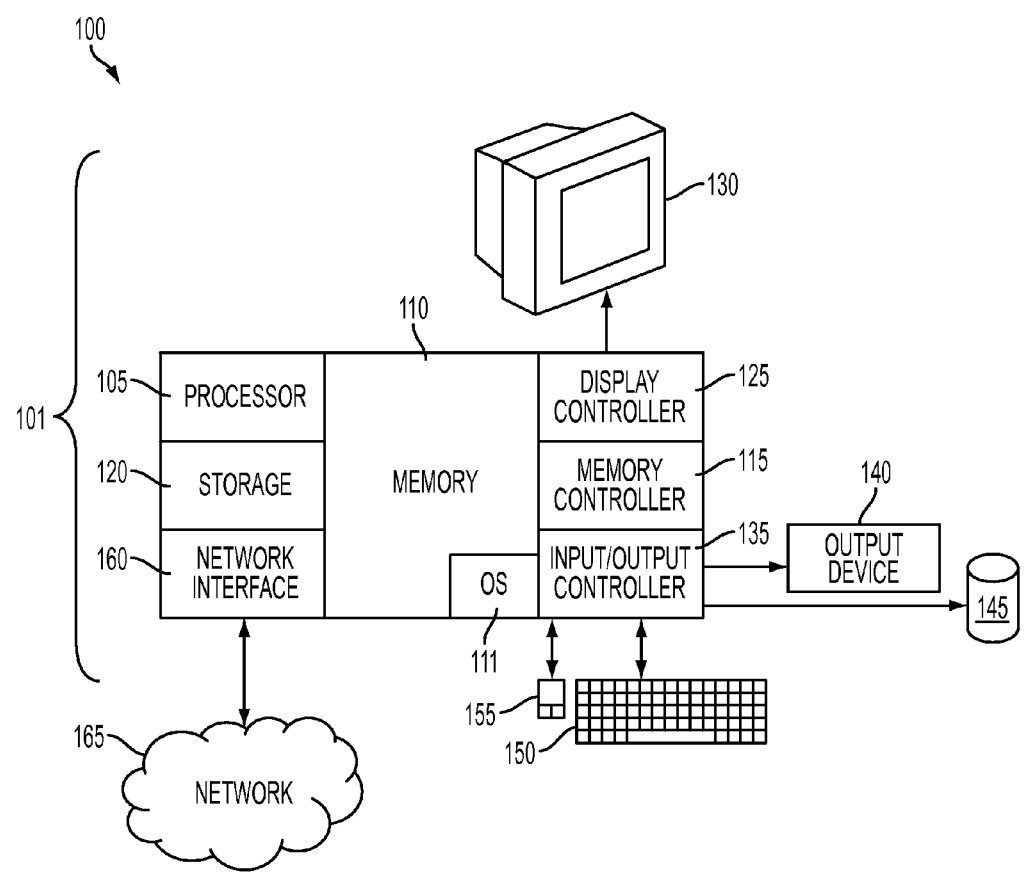
FIG. 1 illustrates an exemplary embodiment of a system for a storage controller cache page management.

FIG. 1 illustrates an exemplary embodiment of a system 100 for a storage controller cache page management. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 (including an operating system (OS) 111) coupled to a memory controller 115, and one or more input and/or output (I/O) devices 140, 145 (or peripherals) that are communicatively coupled via a local input/output controller 135. For example, the output device 145 can be a hard drive onto which virtual memory resides. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. In exemplary embodiments, the input/output controller 135 can be a storage controller as described herein and can include a storage controller cache into and out of which memory pages are paged. As further described herein, the memory page can reside in the memory 110 and be accessed by an active process residing in the memory 110. As further described, the memory page can then be paged into virtual memory (e.g., on the output device 145) via the input/output controller 135 or command queuing mechanism that can be part of the input/output controller 135. An example of a command queuing mechanism is tagged command queuing (TCQ), which is a technology built into certain ATA and SCSI hard drives. TCQ allows the OS 111 to send multiple read and write requests to a hard drive (e.g., output device 145).

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the storage controller cache page management methods described herein in accordance with exemplary embodiments and the OS 111. The OS 111 essentially controls the execution of other computer programs, such the storage controller cache page management systems and methods as described herein, and provides scheduling, input-output control, file and data management, memory management, and communication control and related services.

The storage controller cache page management methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the storage controller cache page management methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The storage controller cache page management methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the storage controller cache page management methods are implemented in hardware, the storage controller cache page management methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
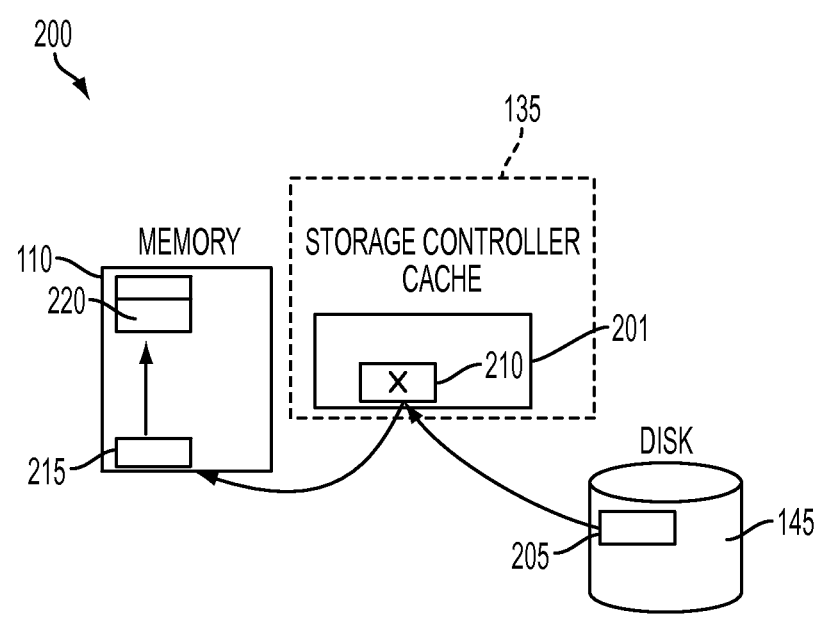
FIG. 2 illustrates a subsystem of the system of FIG. 1, showing further detail.

FIG. 2 illustrates a subsystem 200 of the system of FIG. 1, showing further detail. The subsystem 200 illustrates the memory 110, the input/output controller 135 and the output device 145. FIG. 2 further illustrates that a page 205 that has been previously paged to virtual memory in the storage device 145, as illustrated as a stale page 210 can then be paged back into the storage controller cache 201 in the input/output controller 135. The page 205 can then be paged back to the real memory 110, as illustrated as page 215. The page 215 in real memory 110 can then be modified to a modified page 220, which then results in the page 210 residing in the storage controller cache 201 becoming stale. Conventionally, algorithms such as the LRU algorithm or other garbage collection algorithms can be implemented to remove the stale page 210, which may or may not occur in a timely manner, as described herein. In exemplary embodiments, each memory page 205, 210, 215, 220 has an associated data structure called a page table that, among other things, retains the status of the memory page 205, 210, 215, 220. For example, current memory pages include a page table having a dirty bit that can be set indicating that the memory page is stale. A virtual memory manager (VMM) can set the dirty bit. In addition, the dirty bit is set by hardware every time a memory page is modified. In exemplary embodiments, the system 100 and subsystem 200 can invalidate the stale page 210. As such, the conventional algorithms can subsequently remove the page 210. Alternatively, the OS 111 can send a command to the input/output controller 135 to actively remove the stale page 210 as now described. invalidating the memory page.

Figure 3:
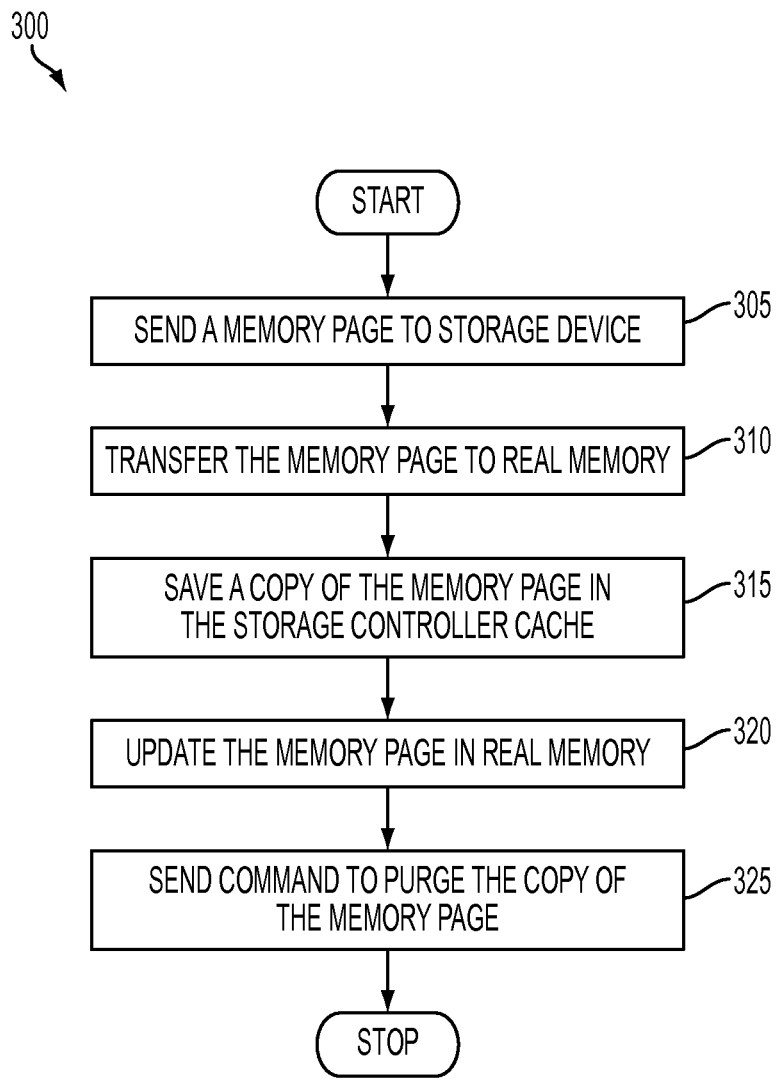
FIG. 3 illustrates a flow chart a method for storage controller cache page management in accordance with exemplary embodiments.
Figure 4:
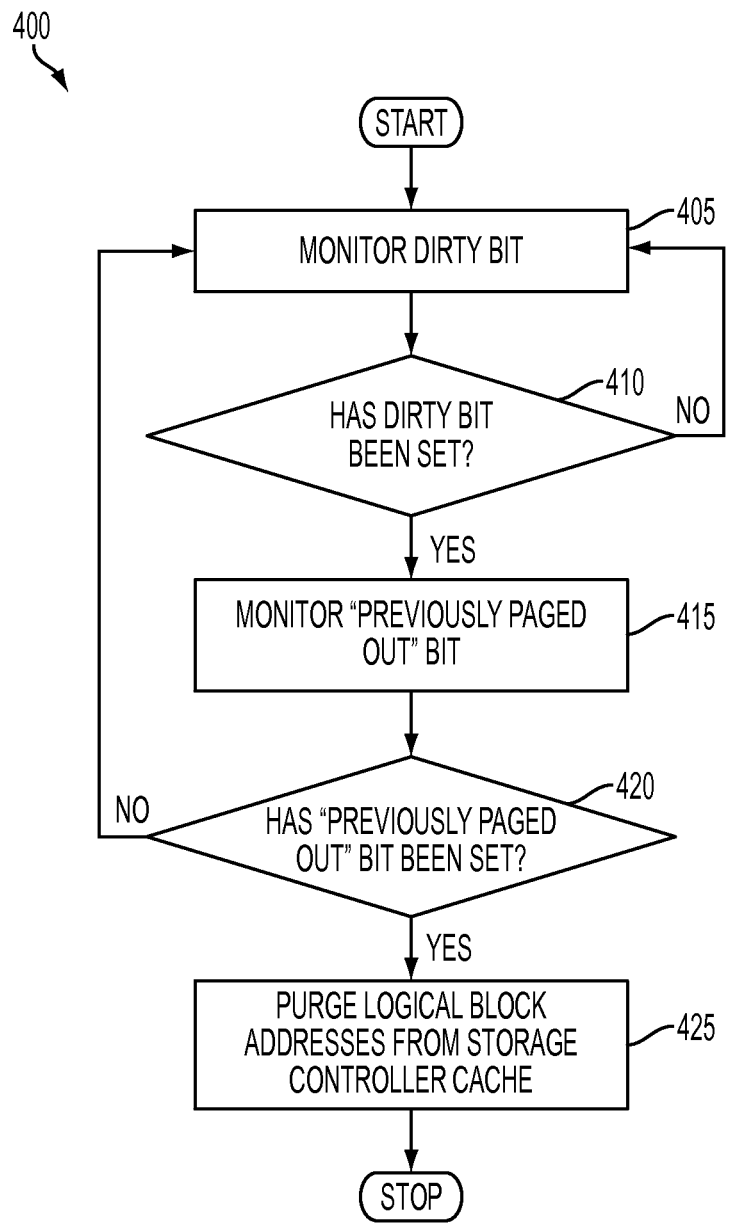
FIG. 4 illustrates a purge method in accordance with exemplary embodiments.

FIG. 3 illustrates a flow chart a method 300 for storage controller cache page management in accordance with exemplary embodiments. As described herein, a first process can be running in the memory 110. If the memory 110 becomes constrained, for example by other processes residing in the memory 110, the processor 105 (e.g., via a VMM and a virtual memory demand request) can send (i.e., page) a memory page 205 to the storage device 145 (e.g., virtual memory on a hard drive) at block 305. For example, an LRU algorithm may be implemented to determine that the page related to the first process has not been used so is paged out. At some later point, the first process becomes active and pages the memory page 215 back into the memory 110 at block 310. During the transfer, a copy of the memory page 210 is saved in the input/output controller 135 (e.g., the storage controller cache 201) at block 315. In exemplary embodiments, the associated page table can include a "previously paged out" bit that can be set in the page table. The "previously paged out" bit resides in the page table with the current set of status bits. The "previously paged out" tracks if a given memory page has been previously paged out. At block 320, the first process can update the memory page 215 to an updated memory page 220, thus invalidating the copy of the memory page 210 residing in the storage controller cache 201. At this point, the copy of the memory page 210 is therefore outdated and stale. The stale copy of the memory page 210 therefore residing in the storage controller cache 201 taking up storage space. As such, at block 325, as part of the page invalidation process in the OS 111 can send a command to the input/output controller 134 to invalidate the copy of the memory page 210 residing in the storage controller cache 201. Various system calls can be made as part of the process, including, but not limited to device driver calls, AIX kernel calls and the like. In exemplary embodiments, the VMM sets the dirty bit thereby invalidating the memory page 210 in the storage controller cache 201. FIG. 4 illustrates a purge method 400 in accordance with exemplary embodiments. When the dirty bit is set, the system 100 then performs the purge method 400, which works in conjunction with the method 300 for storage controller cache page management at block 325.

Referring to FIG. 4, at block 405, the system 100 monitors the dirty bit in each page table to see if the dirty bit has been set for a given page. At block 410, the system 100 checks to see if the dirty bit has been set. If the dirty bit has not been set at block 410, then the method 400 continues to monitor the dirty bit at block 405. If the dirty bit has been set at block 410, then at block 415, the system 100 monitors to see if the "previously paged out" bit has been set in he page table. At block 420, the system 100 checks to see if the "previously paged out" bit has been set. If at block 420, the "previously paged out" bit has not been set, then the system continues monitoring at block 405. If at block 420, the "previously paged out" bit has been set, then the system 100 sends a command to purge logical block addresses (LBA) associated with the memory page 210 from the storage controller cache 201 at block 425. By clearing the LBA for the memory page 210 at block 425, the memory page 210 can immediately be removed. In exemplary embodiments, known LBA mapping schemes can be implemented to clear the LBA.

Technical effects includes additional cache optimization realized by removing outdated pages leaving additional cache room for current and relevant pages to be stored, which can also prevent deletion of valid data. In addition fewer pages reside in cache, thereby reducing the processing time for the various garbage collection algorithms within the storage controller microcode. Further, by pro-actively purging these pages, the systems and methods described herein reduce the chance for bugs that can occur by reading in stale data from the storage controller cache. In addition, pages within the storage controller cache can be flushed to optimize performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A cache page management method, comprising:

paging a memory page from a real memory to a virtual memory, the virtual memory being a peripheral device to a computer system that includes the real memory and an input/output controller;

paging out the memory page from the virtual memory to the input/output controller;

paging the memory page from the input/output controller into the real memory;

modifying the memory page in the real memory to an updated memory page such that the memory page in the input/output controller becomes a stale memory page based on the modifying of the memory page in the real memory; and purging the stale memory page from the input/output controller, wherein purging the stale memory page from the input/output controller comprises:

monitoring a dirty bit in a page table that is associated with the memory page in the input/output controller;

based on determining that the dirty bit has been set in the page table associated with the memory page, monitoring a previously paged out bit in the page table associated with the memory page in the input/output controller; and based on determining that the previously paged out bit has been set in the page table associated with the memory page, determining that the memory page is the stale memory page and sending a command to purge logical block addresses associated with the memory page in the input/output controller.

2. The method as claimed in claim 1 wherein the memory page is paged out to a storage controller cache in the input/output controller, and wherein the stale memory page is purged from the storage controller cache.

3. The method as claimed in claim 1 wherein the memory page is paged out to from the real memory to the virtual memory based on the real memory becoming constrained based on a process that is running in the real memory, and wherein the memory page is paged into the real memory from the input/output controller due to a virtual memory demand request.

4. The method as claimed in claim 1 wherein the memory page in the real memory is modified to the updated memory page due to a process update.

5. The method as claimed in claim 1 further comprising sending a command by an operating system of the computer system that is running in the real memory to purge the stale memory page from the input/output controller to at least one of the input/output controller or a command queuing mechanism that resides in the real memory.

6. The method as claimed in 5 wherein the stale memory page in the input/output controller is an outdated version of the updated memory page in the real memory.

7. A computer program product including a non-transitory computer readable medium readable by a processing circuit and storing instructions for execution by the processing circuit for causing a computer to implement a cache page management method, the method comprising:

paging a memory page from a real memory to a virtual memory, the virtual memory being a peripheral device to a computer system that includes the real memory and an input/output controller;

paging out the memory page from the virtual memory to the input/output controller;

paging the memory page from the input/output controller into the real memory;

modifying the memory page in the real memory to an updated memory page such that the memory page in the input/output controller becomes a stale memory page based on the modifying of the memory page in the real memory; and purging the stale memory page from the input/output controller, wherein purging the stale memory page from the input/output controller comprises:

monitoring a dirty bit in a page table that is associated with the memory page in the input/output controller;

based on determining that the dirty bit has been set in the page table associated with the memory page, monitoring a previously paged out bit in the page table associated with the memory page in the input/output controller; and based on determining that the previously paged out bit has been set in the page table associated with the memory page, determining that the memory page is the stale memory page and sending a command to purge logical block addresses associated with the memory page in the input/output controller.

8. The computer program product as claimed in claim 7 wherein the memory page is paged out to a storage controller cache in the input/output controller, and wherein the stale memory page is purged from the storage controller cache.

9. The computer program product as claimed in claim 7 wherein the memory page is paged out to from the real memory to the virtual memory based on the real memory becoming constrained based on a process that is running in the real memory, and wherein the memory page is paged into the real memory from the input/output controller due to a virtual memory demand request.

10. The computer program product as claimed in claim 7 wherein the memory page in the real memory is modified to the updated memory page due to a process update.

11. The computer program product as claimed in claim 7 wherein the method further comprises sending a command by an operating system of the computer system that is running in the real memory to purge the stale memory page from the input/output controller to at least one of the input/output controller or a command queuing mechanism that resides in the real memory.

12. The computer program product as claimed in 11 wherein the stale memory page in the input/output controller is an outdated version of the updated memory page in the real memory.

13. A cache page management system, comprising:

a processor;

an input/output controller operatively coupled to the processor;

a storage controller cache residing on the input/output controller;

a real memory operatively coupled to the processor and the input/output controller;

a virtual memory operatively coupled to the input/output controller, the virtual memory being a peripheral device to a computer system that includes the real memory and an input/output controller; and a cache page management process residing in the real memory, the process including instructions for:

paging a memory page from the real memory to the virtual memory;

paging out the memory page from the virtual memory to the input/output controller;

paging the memory page from the input/output controller into the real memory;

modifying the memory page in the real memory to an updated memory page such that the memory page in the input/output controller becomes a stale memory page based on the modifying of the memory page in the real memory; and purging the stale memory page from the input/output controller, wherein purging the stale memory page from the input/output controller comprises:

monitoring a dirty bit in a page table that is associated with the memory page in the input/output controller;

based on determining that the dirty bit has been set in the page table associated with the memory page, monitoring a previously paged out bit in the page table associated with the memory page in the input/output controller; and based on determining that the previously paged out bit has been set in the page table associated with the memory page, determining that the memory page is the stale memory page and sending a command to purge logical block addresses associated with the memory page in the input/output controller.

14. The system as claimed in claim 13 wherein the cache page management process further includes instructions for sending a command by an operating system of the computer system that is running in the real memory to purge the stale memory page from the input/output controller to at least one of the input/output controller or a command queuing mechanism that resides in the real memory.

15. The system as claimed in 14 wherein the stale memory page in the input/output controller is an outdated version of the updated memory page in the real memory.

* * * * *